Patented July 12, 1938

2,123,373

UNITED STATES PATENT OFFICE 2,123,373

PROCESS FOR THE MANUFACTURE OF AMMONIUM DITHIOCARBAMATE

Roger A. Mathes, Akron, Ohio, assignor to The B. F. Goodrich Company, New York, N. Y., a corporation of New York No Drawing. Application September 30, 1937, Serial No. 166,589

13 Claims. (Cl. 260—112)

This invention relates to an improved process for the manufacture of ammonium dithiocarbamate.

The objects of the invention are the manufacture of ammonium dithiocarbamate of high purity, in yields which approach the theoretical and at an economical cost. These objects have not been previously attainable by the methods described in the literature.

Previous workers used alcohol as a diluting medium or diluent for the interaction of carbon disulfide and ammonia to form ammonium dithiocarbamate. Poor yields of rather impure ammonium dithiocarbamate were obtained.

According to the present invention, carbon disulfide is dissolved in a nitrile which serves as a diluent, and ammonia is passed in. Ammonium dithiocarbamate is formed as a crystalline compound and precipitates almost immediately.

Nitriles which may be used as diluents according to this invention are the stable liquid nitriles including alkyl nitriles, such as acetonitrile and its homologues, as well as aryl nitriles, such as benzonitrile and the like.

The reaction is preferably carried out in a reactor provided with some cooling device such as a jacket for circulating brine. Approximately one molecular proportion of carbon disulfide is dissolved in the diluting nitrile. Approximately two molecular proportions of ammonia are passed in, with agitation.

A temperature range of 15°-35° C. is convenient for operating purposes and gives satisfactory results. Higher or lower temperatures may also be employed.

The reaction can also be carried out at a pressure greater than atmospheric in which case loss of ammonia is prevented.

After a short period of ammonia addition, ammonium dithiocarbamate crystallizes out, being only sparingly soluble in the diluting nitriles commonly employed. When the required amount of ammonia has been added, agitation is preferably continued for a short time, and the ammonium dithiocarbamate is then filtered off. The product may be air dried to remove nitrile. If higher boiling nitriles are employed, a wash with an inert, volatile solvent is desirable.

A modification in this procedure may be adopted when a water solution of ammonium dithiocarbamate is desired. In this case a nitrile of molecular weight sufficiently high to have a low water solubility, such as valeronitrile, benzonitrile or glutaric nitrile, should be used. Water is added to the suspension of ammonium dithiocarbamate in the diluting nitrile, the product is readily dissolved, and its water solution separated from the nitrile. An advantage of this alternative method is the fact that a water solution of ammonium dithiocarbamate is more stable than the dry powder.

The following examples describe the process more specifically but it will be understood that the invention is not limited to these details. Wide variations both in the process and amounts of reactants are possible without materially affecting the results.

Example 1

32 g. of carbon disulfide are dissolved in 150 cc. of acetonitrile in a reaction flask. Over a period of about an hour, 14 g. of ammonia are passed in, with agitation. After a few minutes of ammonia addition, light yellow crystals of ammonium dithiocarbamate start to precepitate. The temperature is maintained at 20-25° C. during the course of the reaction.

After all the ammonia has been added, the thick reaction mixture is allowed to agitate about fifteen minutes, then filtered and dried. The dry weight is 40.5 g., representing a 90% yield.

Example 2

The process, essentially as described in Example 1, is repeated using 22 g. of carbon disulfide, 9 g. of ammonia and 95 cc. of benzonitrile. The ammonium dithiocarbamate, after filtering, is washed with hexane and dried. The dry weight is 26 g., representing an 86.5% yield.

From the data herein presented, the fact will be readily apparent that this invention constitutes a distinct improvement over previous processes for preparing ammonium dithiocarbamate. Yields have been increased to over 86%. The quality of ammonium dithiocarbamate has been greatly improved making purification unnecessary before use of the compound for synthetic work. By this improvement in quality, a distinctly more stable compound is obtained. Conditions for its preparation according to this invention do not require close control. A wide temperature range may be used; the amounts of reactants may be varied greatly from those theoretically required, without affecting adversely either the yield or quality of ammonium dithiocarbamate produced.

I claim:

1. A process for the manufacture of ammonium dithiocarbamate which comprises interacting ammonia and carbon disulfide in the presence of a stable, liquid hydrocarbon-nitrile.

2. A process according to claim 1 where substantially one molecular proportion of carbon disulfide is caused to react with substantially two molecular proportions of ammonia.

3. A process according to claim 1 where the ammonium dithiocarbamate formed is water extracted from the suspension in a diluting nitrile of low water solubility.

4. A process for the manufacture of ammonium dithiocarbamate which comprises the introduction of gaseous ammonia into carbon disulfide diluted with a stable, liquid hydrocarbon-nitrile.

5. A process for the manufacture of ammonium dithiocarbamate which comprises interacting ammonia and carbon disulfide in the presence of an alkyl nitrile.

6. A process according to claim 5 where substantially one molecular proportion of carbon disulfide is caused to react with substantially two molecular proportions of ammonia.

7. A process for the manufacture of ammonium dithiocarbamate which comprises interacting ammonia and carbon disulfide in the presence of acetonitrile.

8. A process for the manufacture of ammonium dithiocarbamate which comprises the introduction of gaseous ammonia into carbon disulfide diluted with acetonitrile, in the proportion of two molecular proportions of ammonia to one of carbon disulfide.

9. A process according to claim 8 where the ammonium dithiocarbamate formed is water extracted from the suspension in a diluting aryl nitrile of low water solubility.

10. A process for the manufacture of ammonium dithiocarbamate which comprises interacting ammonia and carbon disulfide in the presence of an aryl nitrile.

11. A process according to claim 10 where substantially one molecular proportion of carbon disulfide is caused to react with substantially two molecular proportions of ammonia.

12. A process for the manufacture of ammonium dithiocarbamate which comprises interacting ammonia and carbon disulfide in the presence of benzonitrile.

13. A process for the manufacture of ammonium dithiocarbamate which comprises interacting substantially two molecular proportions of ammonia and one molecular proportion of carbon disulfide in the presence of benzonitrile, and extracting the product with water.

ROGER A. MATHES.